(12) United States Patent
Salinas et al.

(10) Patent No.: US 10,853,478 B1
(45) Date of Patent: *Dec. 1, 2020

(54) ENCRYPTED STORAGE AND PROVISION OF AUTHENTICATION INFORMATION FOR USE WHEN RESPONDING TO AN INFORMATION TECHNOLOGY INCIDENT

(71) Applicant: Splunk Inc., San Francisco, CA (US)

(72) Inventors: Govind Salinas, Sunnyvale, CA (US); Sourabh Satish, Freemont, CA (US); Robert John Truesdell, Wexford, PA (US)

(73) Assignee: Splunk Inc., San Francisco, CA (US)

( * ) Notice: Subject to any disclaimer, the term of this patent is extended or adjusted under 35 U.S.C. 154(b) by 279 days.

This patent is subject to a terminal disclaimer.

(21) Appl. No.: 16/119,911

(22) Filed: Aug. 31, 2018

(51) Int. Cl.
  *G06F 21/45* (2013.01)
  *G06F 21/60* (2013.01)
  *H04L 29/06* (2006.01)

(52) U.S. Cl.
  CPC ............ *G06F 21/45* (2013.01); *G06F 21/602* (2013.01); *H04L 63/083* (2013.01); *H04L 63/105* (2013.01)

(58) Field of Classification Search
  CPC ..... G06F 21/45; G06F 21/602; H04L 63/105; H04L 63/083
  See application file for complete search history.

(56) References Cited

U.S. PATENT DOCUMENTS

| | | | | |
|---|---|---|---|---|
| 8,019,995 B2* | 9/2011 | van Bemmel | ........ | H04L 63/083 713/168 |
| 8,495,700 B2* | 7/2013 | Shahbazi | .......... | H04W 12/0027 726/1 |
| 9,444,824 B1* | 9/2016 | Balazs | .................... | H04L 63/08 |
| 9,762,607 B2* | 9/2017 | Satish | ................ | H04L 63/1433 |
| 10,116,687 B2* | 10/2018 | Satish | ................ | H04L 63/1416 |
| 10,657,286 B2* | 5/2020 | Nambiar | ............ | G06F 21/6245 |
| 2006/0224742 A1* | 10/2006 | Shahbazi | ................ | H04L 63/20 709/226 |
| 2009/0006861 A1* | 1/2009 | Bemmel | ............... | G06F 21/445 713/189 |
| 2010/0205583 A1 | 8/2010 | Gebhardt et al. | | |

(Continued)

OTHER PUBLICATIONS

Final Office Action, U.S. Appl. No. 16/119,984, dated Jan. 8, 2020, 14 pages.

(Continued)

*Primary Examiner* — Cheng-Feng Huang
(74) *Attorney, Agent, or Firm* — Nicholson De Vos Webster & Elliott LLP

(57) ABSTRACT

Described herein are improvements for responding to incidents in an information technology (IT) environment. In one example, a method includes, in an incident response system, receiving authentication information for use by a first component for responding to an incident in an information technology (IT) environment. The method further includes encrypting the authentication information and storing the authentication information in the incident response system along with encrypted parameters for operating the first component. In the incident response system, upon determining that the first component requires the authentication information for an interaction, the method provides retrieving the authentication information and providing the authentication information to the first component.

25 Claims, 9 Drawing Sheets

(56) References Cited

U.S. PATENT DOCUMENTS

| | | |
|---|---|---|
| 2012/0079272 A1 | 3/2012 | Tolle et al. |
| 2012/0110330 A1 | 5/2012 | Dickgiesser et al. |
| 2013/0124807 A1 | 5/2013 | Nielsen et al. |
| 2015/0121523 A1 | 4/2015 | Crowley et al. |
| 2016/0164919 A1* | 6/2016 | Satish ................. H04L 63/0236 726/1 |
| 2016/0203336 A1* | 7/2016 | Nambiar ............. G06F 21/6254 726/26 |
| 2018/0013785 A1* | 1/2018 | Satish ................. H04L 63/0236 |
| 2019/0007448 A1* | 1/2019 | Satish ................. H04L 63/1416 |
| 2019/0014144 A1* | 1/2019 | Satish ................... G06F 21/554 |
| 2019/0081975 A1* | 3/2019 | Iaroshevych ....... H04L 63/1425 |

OTHER PUBLICATIONS

Non-Final Office Action, U.S. Appl. No. 16/119,984, dated Oct. 2, 2019, 14 pages.

Notice of Allowance, U.S. Appl. No. 16/119,984, dated Apr. 22, 2020, 8 pages.

* cited by examiner

| COMPONENT INFORMATION 321 | | |
|---|---|---|
| COMPONENT | AUTH. USERS | |
| 371 | ALL | AUTH. INFO. 471 | PARAMETERS 481 |
| 372 | ALL | AUTH. INFO. 472 | PARAMETERS 482 |
| 373 | 343, 344 | AUTH. INFO. 473 | PARAMETERS 483 |
| 374 | 344 | AUTH. INFO. 474 | PARAMETERS 484 |
| 375 | ALL | AUTH. INFO. 475 | PARAMETERS 485 |

400

US 10,853,478 B1

ENCRYPTED STORAGE AND PROVISION OF AUTHENTICATION INFORMATION FOR USE WHEN RESPONDING TO AN INFORMATION TECHNOLOGY INCIDENT

TECHNICAL BACKGROUND

Information technology (IT) environments often employ various computing components, both physical and virtual, to provide desired operations. These computing elements may include end user computing devices, host computing devices, virtual machines, switches, routers, firewalls, and the like. To maintain efficient and effective operations of the IT environment, incident response services may be employed that can respond to various incidents within the IT environment. These incidents may include or be associated with viruses, malware, spyware, denial of service attacks, phishing attacks, server crashes, device failures, power outages, unknown communications, or some other similar incident.

However, while incident response services provide response operations to incidents within the IT environment, difficulties arise as the size and complexity of the IT environment increases. These difficulties are often compounded when the new computing components provide different operations and are configured with varying hardware and software configurations. Further, the increasing number computing components in combination with limited administrative personnel and resources can make it difficult to manage the investigation and remediation of incidents in the environment. Even with ample administrators or analyst users, it can be cumbersome to coordinate the investigation and remediation efforts.

Overview

Described herein are improvements for responding to incidents in an information technology (IT) environment. In one example, a method includes, in an incident response system, receiving authentication information for use by a first component for responding to an incident in an information technology (IT) environment. The method further includes encrypting the authentication information and storing the authentication information in the incident response system along with encrypted parameters for operating the first component. In the incident response system, upon determining that the first component requires the authentication information for an interaction, the method provides retrieving the authentication information and providing the authentication information to the first component.

DETAILED DESCRIPTION

For a particular information technology (IT) environment, one or more administrative users can be tasked with maintaining the devices, systems, and networks of the IT environment. Maintenance tasks may include handling any incidents that the IT environment encounters. Incidents that may constitute security threats may include malware (e.g., viruses, worms, ransomware, etc.), denial of service attacks, unauthorized access attempts, information fishing schemes, or some other type of computer or network related event that could adversely affect the IT environment or users of the IT environment. Other types of incidents, such as operational incidents (e.g., software issues, hardware issues, connectivity issues, etc.), that may occur within an IT environment may also be handled. Upon being notified of an incident, an administrative user uses tools provided by the IT environment to perform various actions for handling the incident. The tools may include functions that, depending on the type of incident, find the source of the incident (e.g., a source address or domain of a network attack), remove an offending process (e.g., deleting malware), isolate an affected component of the IT environment in a VLAN, identify components related to the affected component, implementing a firewall rule (e.g., to block certain network traffic), or any other action for identifying whether an incident is a security threat and, if so, to neutralize the security threat.

For a component to perform an action, the component in many cases will require some type of authorization information (e.g., username, password, security token, etc.) to ensure an authorized party or system is giving the instruction to perform the action. Similarly, the component itself may be required to supply authorization information to another component with which the component needs to interact in order to perform the directed action. Requiring a user to input the authorization information each time the action needs to be performed is not only tedious for the user but also removes much of the benefit when automating incident response tasks that require the action. As such, the examples herein describe improvements to an incident response system that allow the incident response system to securely maintain and distribute authorization information when needed by a component.

Figure 1:
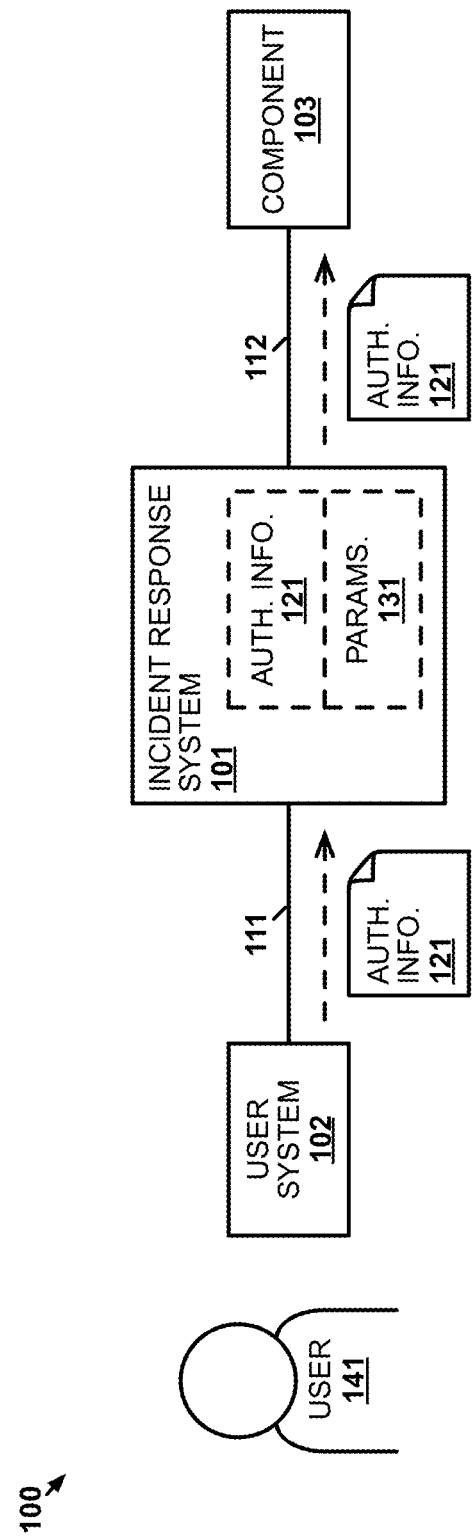
FIG. 1 illustrates an example implementation for storing and providing authentication information when responding to an IT incident.

FIG. 1 illustrates implementation 100 for storing and providing authentication information when responding to an IT incident. Implementation 100 includes incident response system 101, user system 102, and component 103. Incident response system 101 and user system 102 communicate over communication link 111. Incident response system 101 and component 103 communicate over communication link 112. Communication link 111 and communication link 112 may be direct links or may include one or more intervening systems, networks, and/or devices. Component 103 is a computing system or device that performs one or more actions when responding to an incident in an IT environment. Any of incident response system 101, user system 102, and component 103 may be considered part of the IT environment.

In operation, user 141 is one of what may be multiple users tasked with handling incidents, which are potential security threats in this example, in an IT environment. It should be understood that other types of incidents, such as operational incidents, may also be handled in accordance with the description below. User 141 operates user system 102, which may be a personal workstation or other computing device of user 141, to receive information about incidents and to instruct incident response system 101 to handle those incidents by performing various actions using components like component 103. As mentioned above, component 103 may require some type of authorization information, authorization information 121 in this example, to comply with instructions from incident response system 101. Rather than user 141 having to provide authorization information 121 every time incident response system 101 instructs component 103 to perform an action, incident response system 101 securely stores authorization information 121 so that authorization information 121 can be provided to component 103 as needed.

In some examples, user 141 may operate incident response system 101 directly through a user interface thereof rather than using a separate system, such as user system 102. Likewise, in some examples, the tasks performed by user system 102 and incident response system 101 may be distributed differently between user system 102 and incident response system 101. In those examples, the combination of incident response system 101 and user system 102 as a whole may be considered an incident response system.

Figure 2:
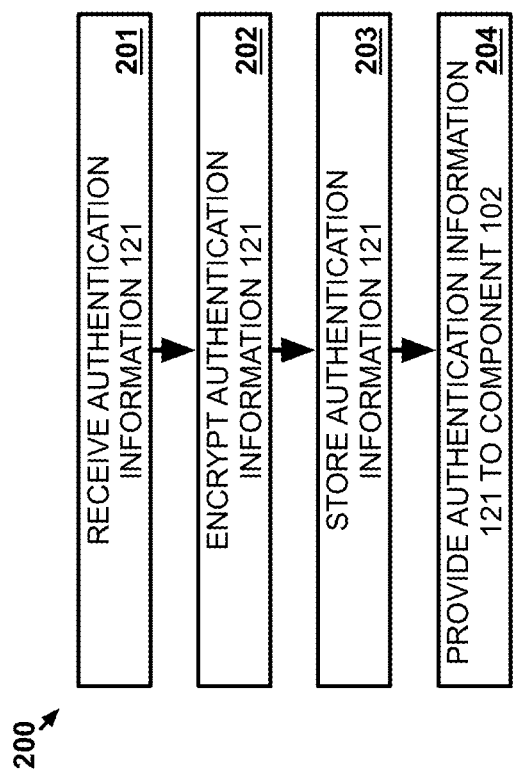
FIG. 2 illustrates an example operation for storing and providing authentication information when responding to an IT incident.

FIG. 2 illustrates a flowchart of operation 200 for storing and providing authentication information when responding to an IT incident. In operation 200, incident response system 101 receives authentication information for use by component 103 when responding to an incident in an IT environment (201). Component 103 may be any type of computing system, computing device, network device (e.g., router, firewall, switch, edge system, etc.), that may be used to perform an action when responding to an incident. The action may be investigatory (i.e., an action to determine information about the incident), remedial (i.e., an action to remedy an issue caused by the incident), preventative (i.e., an action to prevent a similar incident from happening again), or some other type of action that may be useful when responding to an incident.

Incident response system 101 may receive authorization information 121 from user 141 via user system 102, from an authentication server, or from some other source. Authorization information 121 may be specific to user 141 (e.g., to differentiate user 141 from other users), may be specific to an entity with which user 141 is associated (e.g., user 141's employer), may be specific to a group of users of which user 141 is a part, may be specific to a particular system (e.g., to differentiate incident response system 101 from other systems), may be specific to component 103 (e.g., component 103 may have a single set of authorization information that is used by anyone or anything attempting to interact with component 103), or some other manner of distinguishing authentication information. In some examples, incident response system 101 may be considered a user itself and authorization information 121 may be the same type of authorization information that a human user would use only instead being associated with non-human incident response system 101.

Incident response system 101 encrypts authorization information 121 (202) and stores authorization information 121 in authorization information 121 along with operating parameters 131 for operating the component 103 (203). Operating parameters 131 includes any information incident response system 101 may need to interact with component 103. Operating parameters 131 may include an instruction set (e.g., application programming interface) for interacting with component 103, settings that component 103 should use when operating, restrictions on component 103's operation, directions for instantiating component 103 as a virtual computing element (e.g., virtual machine or container) on a host computing system, or some other type of information that may be useful to incident response system 101. Any form of data encryption may be used by incident response system 101 depending on a desired level of security. Operating parameters 131 may also be encrypted. Authorization information 121 and operating parameters 131 may use the same type of encryption or may use different types of encryption. In some examples, authorization information 121 and operating parameters 131 may be encrypted together as one data set rather than being separately encrypted.

Upon incident response system 101 determining that component 103 requires the authentication information for an interaction, incident response system 101 retrieves authorization information 121 and provides authorization information 121 to component 103 (204). The interaction may be an interaction between incident response system 101 and component 103 (e.g., component 103 may require authorization information 121 in order for incident response system 101 to instruct component 103 to perform an action, to configure component 103, or some other type of interaction) or may be an interaction between component 103 and another component, or other components, that component 103 interacts with when performing an action (e.g., component 103 may interact with a service or database that requires authorization information 121). In some examples, both types of interactions may be involved and authorization information 121 may include authorization information needed for each type of interaction. Operating parameters 131 may indicate whether authorization information 121 is required for an interaction associated with component 103. Retrieving authorization information 121 may include performing any necessary function to ready authorization information 121 for provision to component 103, such as reading authorization information 121 from storage and decrypting authorization information 121.

Advantageously, since incident response system 101 securely stores authorization information 121 with operating parameters 131, which may be stored by incident response system 101 regardless of whether authorization information 121 is also stored, so that authorization information 121 can simply be provided to component 103 for an interaction upon determining that authorization information 121 is needed for the interaction without having to receive authorization information 121 at that time. While authorization information 121 may be initially received in response to determining that authorization information 121 is needed for an interaction, for subsequent interactions requiring authorization information 121, incident response system 101 need only retrieve and provide authorization information 121. Of course, authorization information 121 may be received preemptively, before any interaction is determined.

Figure 3:
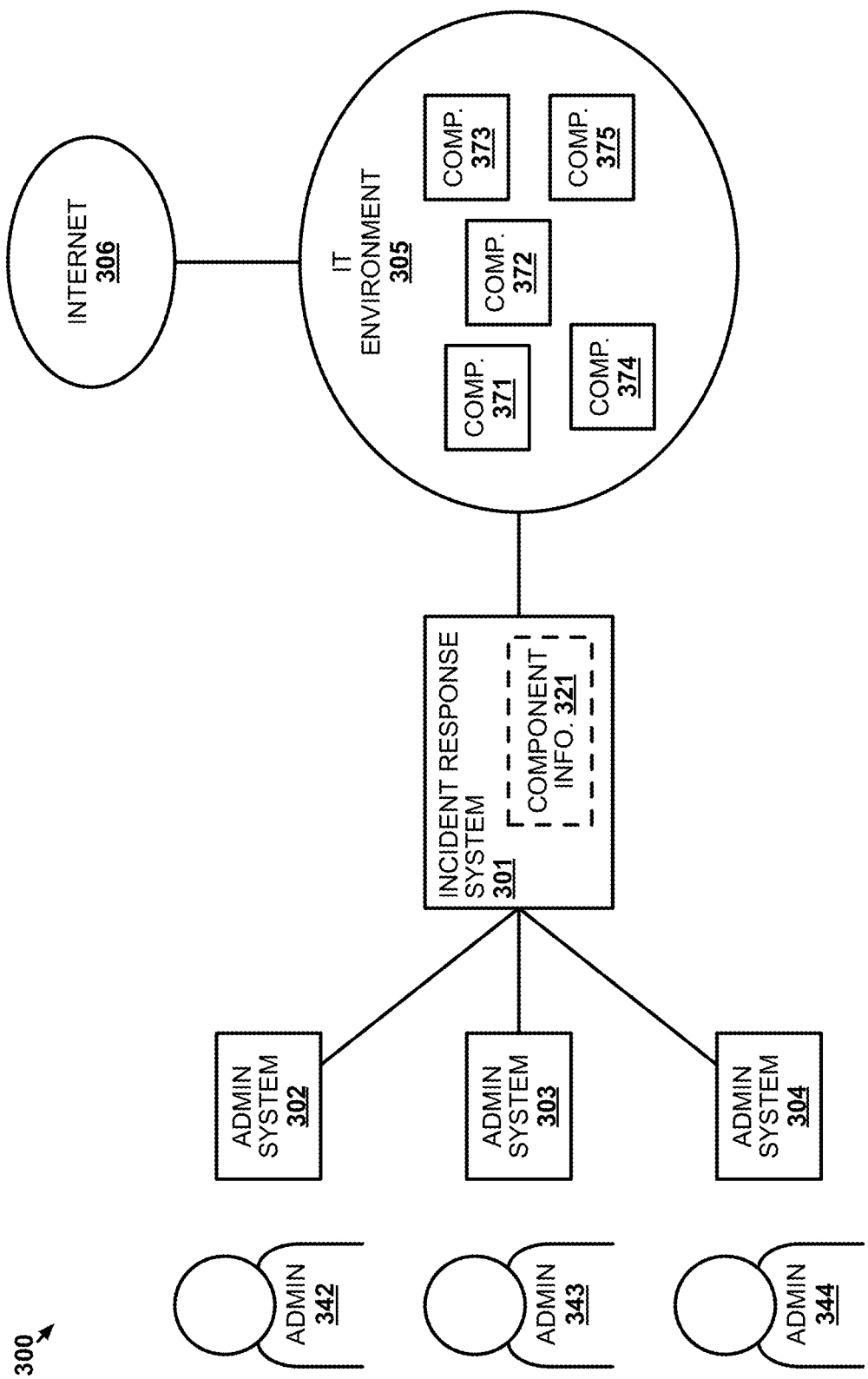
FIG. 3 illustrates an example implementation for storing and providing authentication information when responding to an IT incident.

FIG. 3 illustrates implementation 300 for storing and providing authentication information when responding to an IT incident. Implementation 300 includes incident response system 301, administrative user system 302, administrative user system 303, administrative user system 304, IT environment 305, and Internet 306. Component 371, component 372, component 373, component 374, and component 375 may comprise any combination of physical computing systems (e.g. personal computing systems, host computing systems, servers, and the like), virtual computing systems (e.g. virtual machines or containers), routers, switches, firewalls or some other similar computing element. While Internet 306 is shown connected only to IT environment 305, Internet 306 may be used for communications with any element of implementation 300.

In operation, administrator 342, administrator 343, and administrator 344 are users associated with maintaining IT environment 305. Administrator 342, administrator 343, and administrator 344 operate administrative user system 302, administrative user system 303, and administrative user system 304, respectively, to perform their duties with respect to IT environment 305. Administrative user system 302, administrative user system 303, and administrative user system 304 communicate with incident response system 301 to handle incidents that occur within IT environment 305.

Figure 4:
FIG. 4 illustrates an example information set for storing and providing authentication information when responding to an IT incident.

FIG. 4 illustrates information set 400 for storing and providing authentication information when responding to an IT incident. Information set 400 is an example of what may be included in component information 321, which is stored by incident response system 301 in implementation 300. Component information 321 indicates which of administrator 342, administrator 343, and administrator 344 are authorized to interact with respective ones of components 371-375. For instance, all of administrators 342-344 are authorized to interact with component 371 while only administrators 343 and 344 are authorized to interact with component 373. Component information 321 may receive a list of authorized users for each of components 371-375 from a high-level administrator, may infer the authorized users from each administrator's job description or title, or may receive or determine the authorized users in some other manner.

Component information 321 also includes operating parameters 481-485 for each respective one of components 371-375. Component information 321 includes distinct operating parameters for each of components 371-375 but, in some examples, operating parameters may be the same for same or similar components. In those examples, component information 321 may simply store a single set of operating parameters for the multiple components to which those operating parameters apply.

Component information 321 further includes authorization information 471-475 for each respective one of components 371-375. Each of authorization information 471-475 includes information necessary for a respective component of components 371-375 to allow incident response system 301 to interact with the component and/or for the component to interact with another component, service, or system. In some examples, each of authorization information 471-475 may include authorization on a per user basis (e.g., include a different set of information for each of administrators 302-304, or at least for each of those of administrators 302-304 that are authorized to interact with the respective component as indicated by component information 321). In those examples, when interaction with one of components 371-375 is to be performed, the authentication information of the associated user is provided rather than more general authorization information.

Component information 321 is encrypted to ensure authorization information 471-475 and parameters 481-485 are securely stored in incident response system 301, as already discussed with respect to operation 200. It should be understood that incident response system 301 may comprise a single device (e.g., a computing server) that internally stores component information 321 or component information 321 may be stored elsewhere, such as in a network attached storage system. In the latter examples, multiple devices would be considered incident response system 301.

Figure 5:
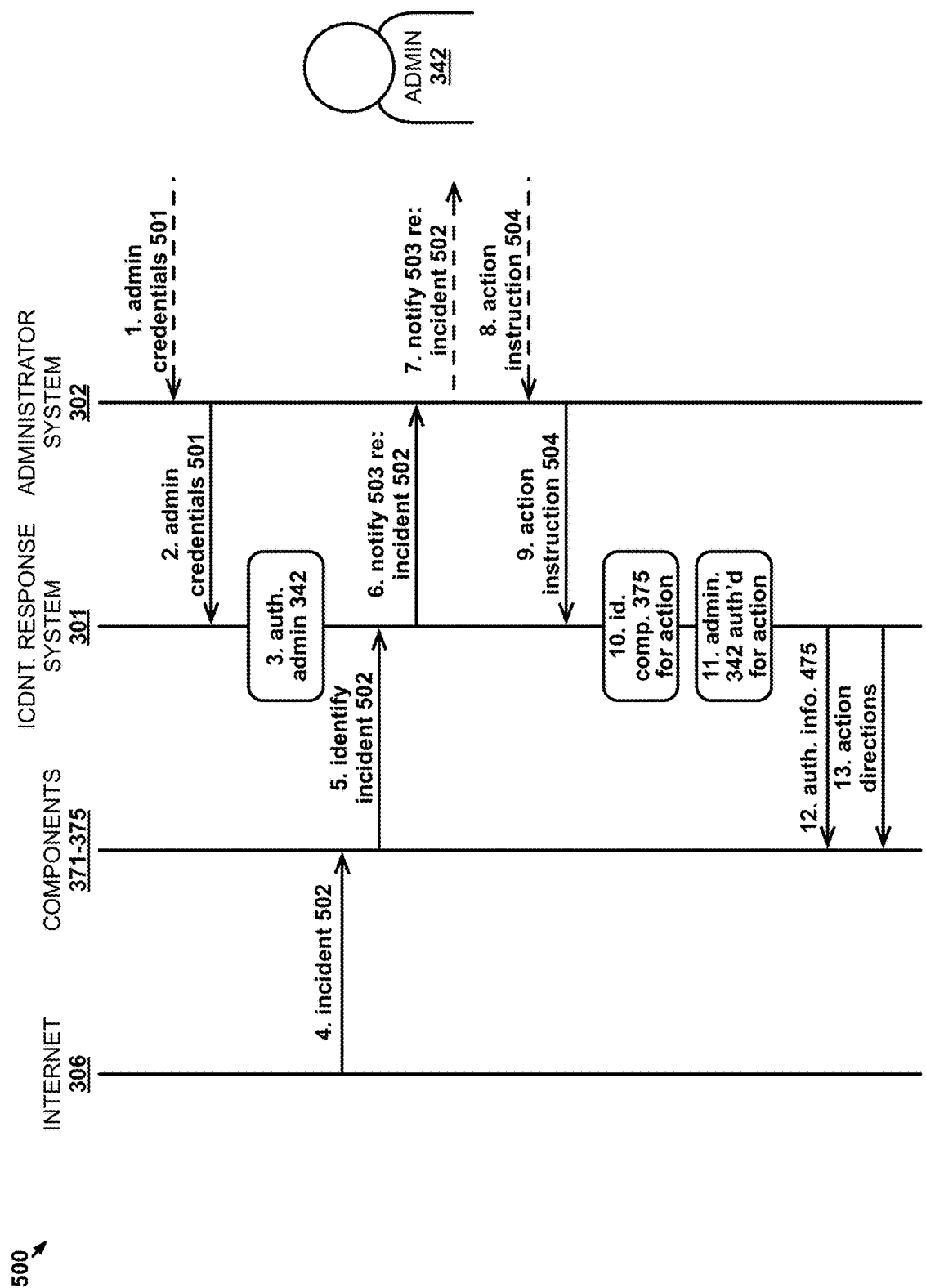
FIG. 5 illustrates an example operation for storing and providing authentication information when responding to an IT incident.

FIG. 5 illustrates a sequence diagram of operation 500 for storing and providing authentication information when responding to an IT incident. Operation 500 is a more detailed example as to how authorization information may be provided to a component when needed for an interaction. In operation 500, administrator 342 logs into incident response system 301 via administrative user system 302 by providing administrator credentials 501 at step 1 as input into administrative user system 302. Administrator credentials 501 are passed at step 2 to incident response system 301 so that incident response system 301 can authenticate administrator 342 at step 3. Administrator credentials 501 may include a username and password associated with administrator 342 to uniquely identify administrator 342 to incident response system 301 in a secure manner. Other manners of securely identifying administrator 342 to incident response system 301 may instead be used in other examples. Of course, if administrator credentials 501 are incorrect, then administrator 342 would not be authenticated by incident response system 301 and operation 500 would not be able to proceed past step 3.

At some point after administrator 342 has logged into incident response system 301, incident 502 occurs at step 4, which originates from Internet 306 and affects one or more of components 371-375. In other examples, incident 502 may originate from within IT environment 305 (e.g., a user may install malware onto one of components 371-375). After occurrence of incident 502, incident response system 301 identifies incident 502 at step 5 by being notified of incident 502 from whichever of components 371-375 identified incident 502. For example, if one of components 371-375 is a firewall that detects suspicious network behavior as being incident 502, then the firewall will notify incident response system 301 of incident 502. The notification of incident 502 may include information describing characteristics of incident 401, such as a source network address/domain, incident type (e.g., virus, fishing, denial of service attack, unauthorized access request, server malfunction, lost connection, etc.), which of components 371-375 were affected, or any other type of information descriptive of incident 401 that may also be used to compare incident 401 to other incidents.

Upon identifying incident 502, incident response system 301 selects administrator 342 to handle incident 502 and transfers notification 503 at step 6 to administrative user system 302 associated with administrator 342. In an alternative example, incident response system 301 may transfer notification 503 to multiple, or all, of administrator user systems 302-304 and allow administrators 342-344 to decide who should handle incident 502 or work together to handle incident 401. Administrative user system 302, responsive to receiving notification 503 from incident response system 301, presents notification 503 at step 7 to administrator 342.

Administrator 342 then begins to handle incident 502 by providing handling instructions to administrative user system 302 at step 8 in the form of action instruction 504, which administrative user system 302 relays to incident response system 301 at step 9. Upon receiving action instruction 504, incident response system 301 determines at step 10 that component 375 is at least one of components 371-375 that will be used to carry out the action indicated by action instruction 504 and incident response system 301 will, therefore, need to interact with component 375 to instruct component 375 to perform the action. Action instruction 504 may explicitly indicate that component 375 is to be used to carry out the action or incident response system 301 may identify component 375 based on incident response system 301's own knowledge of components 371-375 action capabilities. Regardless, incident response system 301 references component information 321 at step 11 to determine whether administrator 342 is authorized to instruct component 375 to perform the action instructed by action instruction 504. Since component information 321 indicates that all of administrators 342-344 are authorized to interact with component 375, incident response system 301 determines that incident response system 301 can interact with component 375 to perform the action indicated by action instruction 504.

Incident response system 301 provides authorization information 475 to component 375 at step 12 in whatever manner component 375 requires to authorize incident response system 301 for interactions. The manner required by component 375 may be provided in operating parameters 485 for component 375. In this example, authorization information 475 is associated with incident response system 301 itself rather than an individual user. However, in other examples, authorization information 475 may be associated with a specific user, administrator 342 in this case, which would allow component 375 to recognize the specific user with which the action is associated. Since authorization information 475 is already included in component information 321 before operation 500 begins, authorization information 475 may have been provided to incident response system 301 for encryption and storage in component information 321 prior to operation 500. Administrator 342 may have provided authorization information 475 to incident response system 301 or authorization information 475 may have been obtained by incident response system 301 from some other source. Regardless, once authorization information 475 is processed by component 375 to authorize interaction with incident response system 301, incident response system 301 provides directions for performing the action instructed by action instruction 504.

Advantageously, administrator 342 does not need to also provide authorization information 475 when providing action instruction 504. Instead, incident response system 301 uses its own authentication procedure for administrator 342 to determine whether administrator 342 is an authorized user for interacting with component 375 and, if so, simply provides already stored authorization information 475 to component 375.

Figure 6:
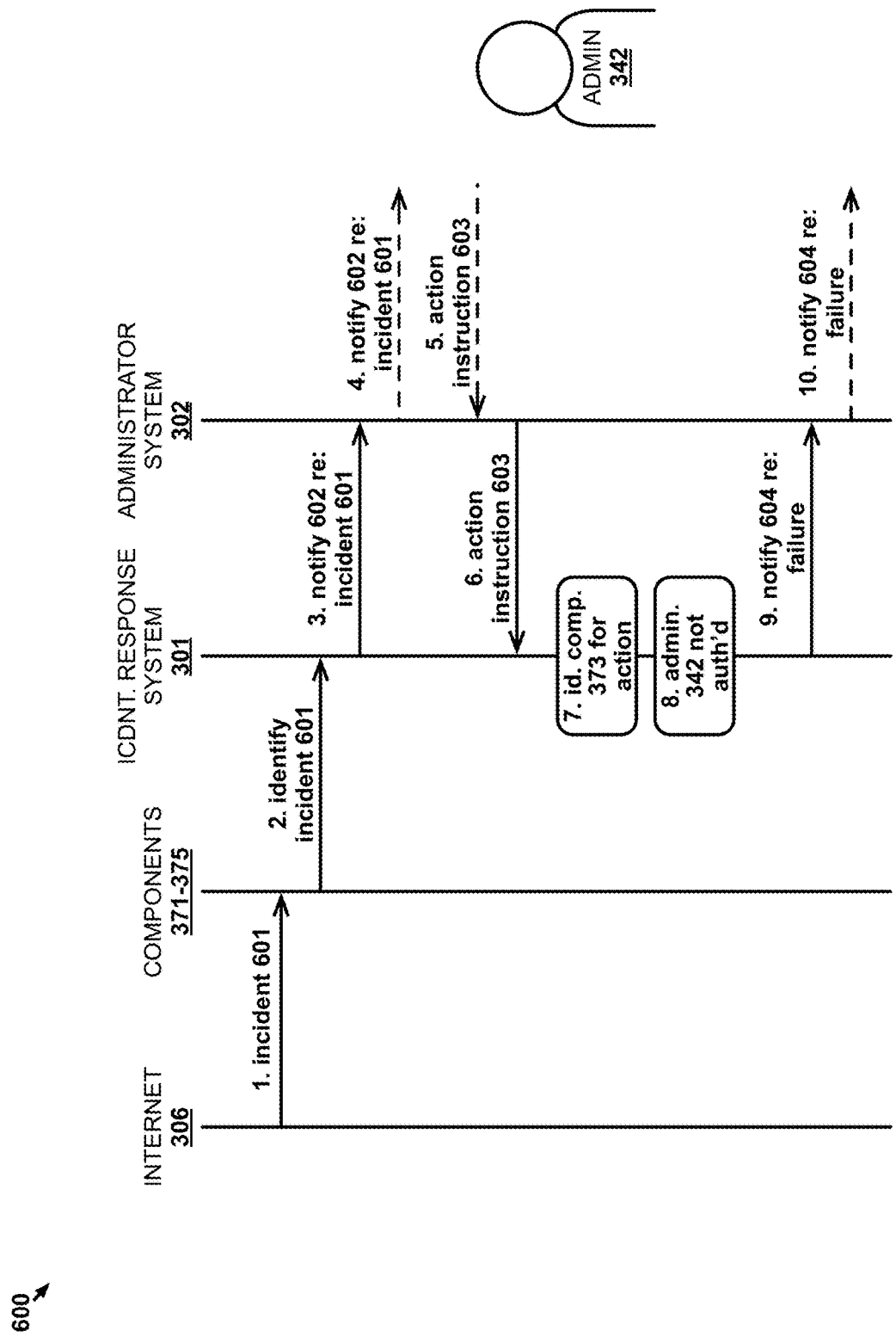
FIG. 6 illustrates an example operation for storing and providing authentication information when responding to an IT incident.

FIG. 6 illustrates a sequence diagram of operation 600 for storing and providing authentication information when responding to an IT incident. Operation 600 is another more detailed example as to how authorization information may be provided to a component when needed for an interaction. Operation 600 may occur after operation 500 because administrator 342 has already logged into incident response system 301 upon start of operation 600. Similar to steps 4-7 of operation 500, in operation 600, incident 601 occurs at step 1, which originates from Internet 306 and affects one or more of components 371-375. After occurrence of incident 601, incident response system 301 identifies incident 601 at step 2 by being notified of incident 601 from whichever of components 371-375 identified incident 601. Upon identifying incident 601, incident response system 301 selects administrator 342 to handle incident 601 and transfers notification 602 at step 3 to administrative user system 302 associated with administrator 342. Administrative user system 302, responsive to receiving notification 602 from incident response system 301, presents notification 503 at step 4 to administrator 342.

Administrator 342 then begins to handle incident 601 by providing handling instructions to administrative user system 302 at step 5 in the form of action instruction 603, which administrative user system 302 relays to incident response system 301 at step 6. Upon receiving action instruction 603, incident response system 301 determines at step 7 that component 373 is at least one of components 371-375 that will be used to carry out the action indicated by action instruction 603 and incident response system 301 will, therefore, need to interact with component 373 to instruct component 373 to perform the action. Incident response system 301 references component information 321 at step 8 to determine whether administrator 342 is authorized to instruct component 373 to perform the action instructed by action instruction 603. Since component information 321 indicates that only administrator 343 and administrator 344 are authorized to interact with component 373, incident response system 301 determines that incident response system 301 cannot interact with component 373 to perform the action indicated by action instruction 603 on behalf of administrator 342.

In this example, incident response system 301 transfers notification 604 at step 9 to administrative user system 302 indicating that incident response system 301 failed to comply with action instruction 603. Notification 604 may indicate a general failure or may specifically indicate that administrator 342 is not authorized to instruct component 373 to perform the action. Administrative user system 302, responsive to receiving notification 604 from incident response system 301, presents notification 604 at step 10 to administrator 342. Incident response system 301 in operation 600, therefore, has prevented an unauthorized user from interacting with component 373 even though administrator 342 was authorized to interact with component 375, as shown in operation 500.

Figure 7:
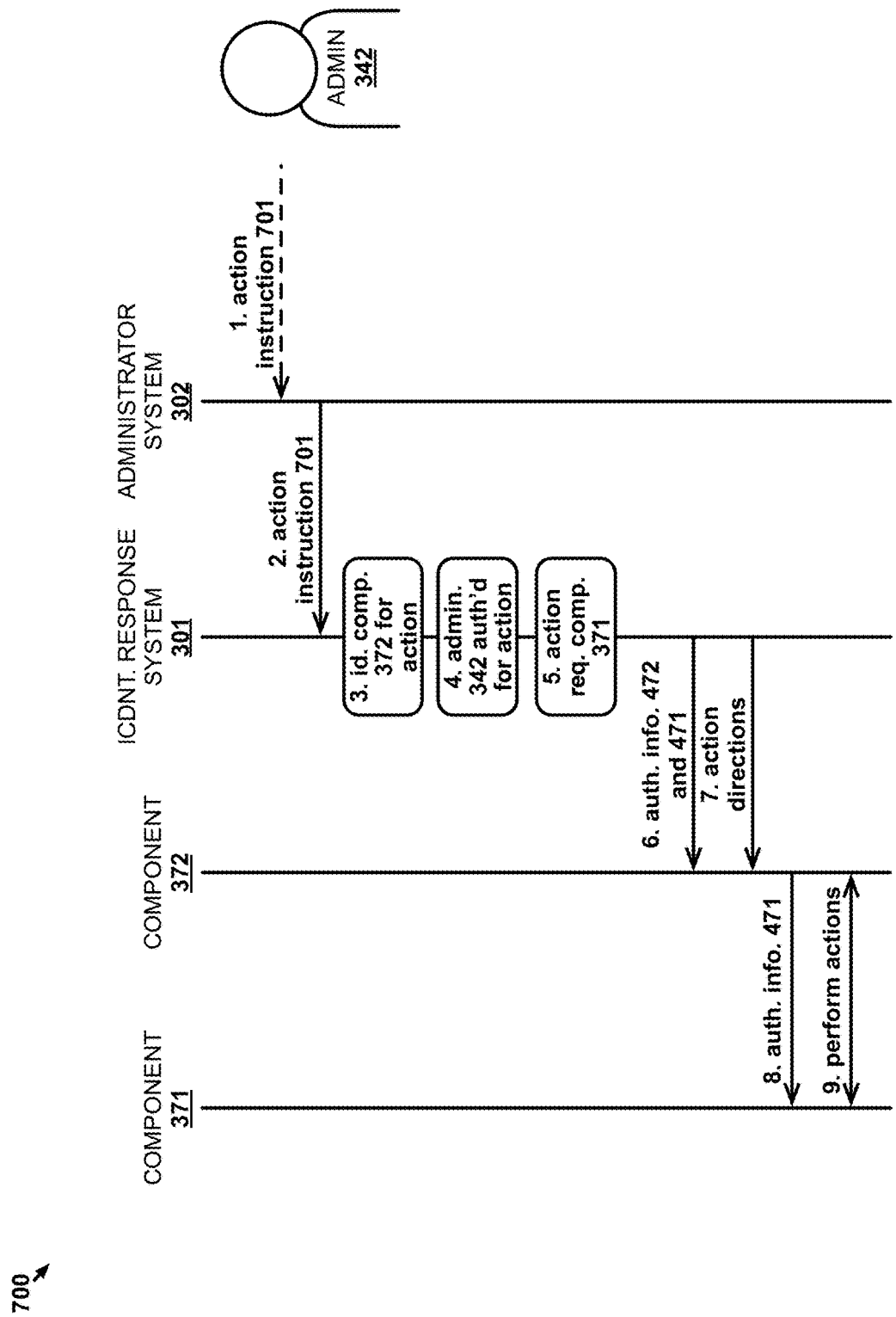
FIG. 7 illustrates an example operation for storing and providing authentication information when responding to an IT incident.

FIG. 7 illustrates a sequence diagram of operation 700 for storing and providing authentication information when responding to an IT incident. Operation 700 begins after administrator 342 has been notified of an incident like that described in steps 1-4 of operation 600. In this example, administrator 342 then begins to handle the incident by providing handling instructions to administrative user system 302 at step 1 in the form of action instruction 701, which administrative user system 302 relays to incident response system 301 at step 2. Upon receiving action instruction 701, incident response system 301 determines at step 3 that component 372 is at least one of components 371-375 that will be used to carry out the action indicated by action instruction 701 and incident response system 301 will, therefore, need to interact with component 372 to instruct component 372 to perform the action. Incident response system 301 references component information 321 at step 4 to determine whether administrator 342 is authorized to instruct component 372 to perform the action instructed by action instruction 701. Since component information 321 indicates that all of administrators 342-344 are authorized to interact with component 375, incident response system 301 determines that incident response system 301 is allowed to interact with component 375 to perform the action indicated by action instruction 504.

In this example, incident response system 301 further determines at step 5 that the action will require that component 372 interact with component 371. For example, component 371 may be a database system or service provider that component 372 may need to access when performing the action of action instruction 701. As such, component 372 will need to authenticate itself to component 371 in addition to incident response system 301 needing to authenticate itself to component 372. Incident response system 301 therefore transfers both authentication information 472 and authentication information 471 to component 372 at step 6. While authentication information 472 and authentication information 471 are illustrated as being provided to component 372 together, incident response system 301 may first provide authorization information 472 to component 372 in whatever manner component 372 requires to authorize incident response system 301 for interactions. Then, after being authorized by component 372 to interact therewith, incident response system 301 may then transfer authentication information 471. In some examples, incident response system 301 may transfer authentication information 471 when providing directions at step 7 for performing the action indicated by action instruction 701. In other examples, component 372 may request authentication information 471 from incident response system 301 when needed. After receiving component 371, component 372 can provide authentication information 471 to component 371 at step 8 in a manner required by component 371 to authenticate component 372. Upon being authorized using authentication information 471, component 372 can interact with component 371 to perform the action as directed by incident response system 301.

It should be understood that, while the action in the above examples is initiated by administrator 342, incident response system 301 may be configured to automatically respond to an incident by initiating the action requiring interaction with one or more of components 371-375. For instance, for incidents of a certain type, incident response system 301 may be programmed, by administrator 342 or another user, to automatically initiate the action and provide the appropriate authentication information for any involved interactions.

Figure 8:
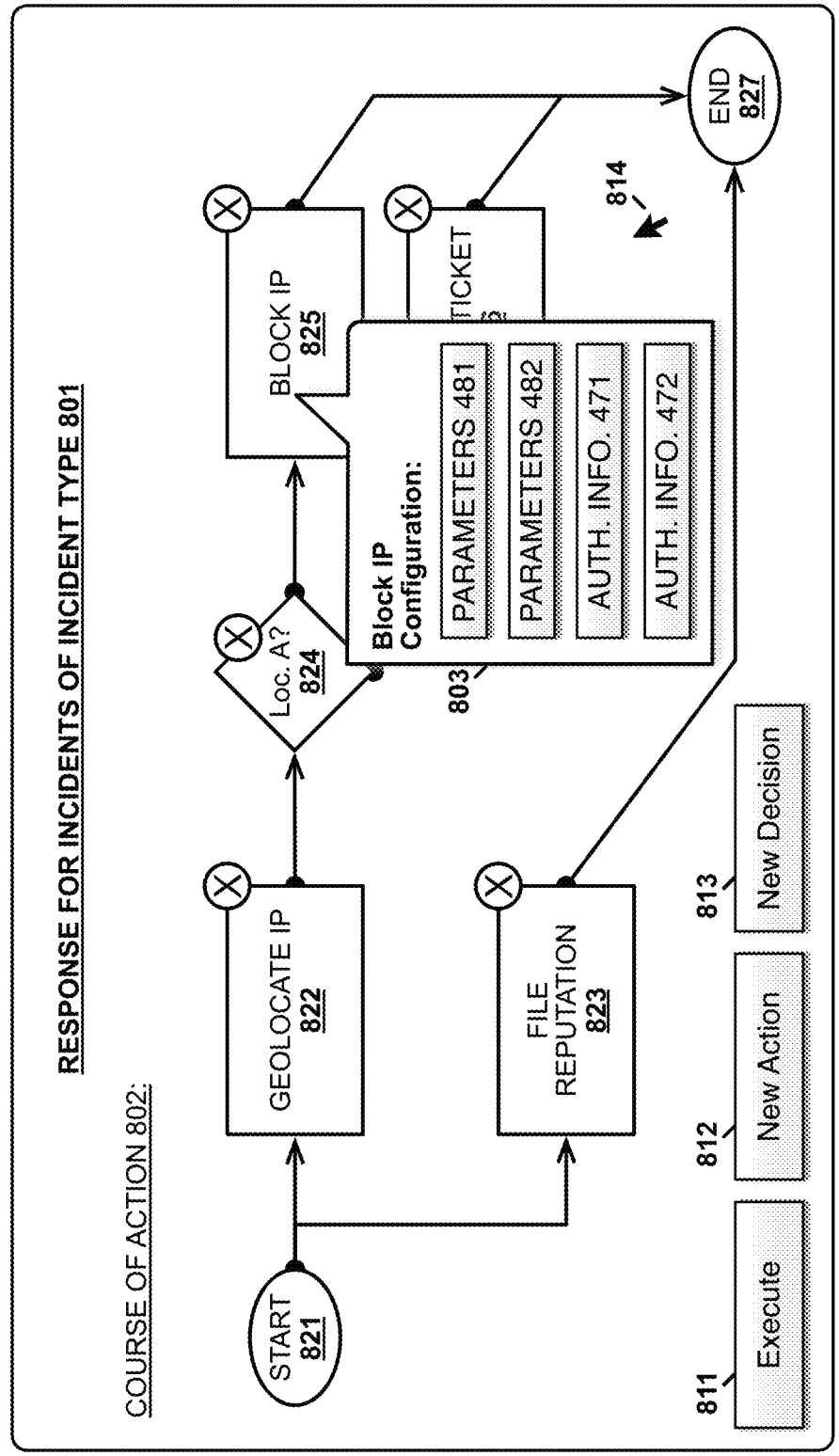
FIG. 8 illustrates an example user interface for storing and providing authentication information when responding to an IT incident.

FIG. 8 illustrates user interface 800 for storing and providing authentication information when responding to an IT incident. User interface 800 is an example of how administrator 342, or any other administrator, may provide action instructions to incident response system 301 via administrative user system 302. Rather than providing individual action instructions, as discussed above, administrator 342, or any other administrator, can create a course of action for responding to an incident that occurs in IT environment 305. A course of action is a defined set of action steps that instruct an incident response system to perform actions when responding to an incident in an IT environment. The course of action may define a particular sequence in which at least a portion of the steps should be performed and define which steps can be performed in parallel. Course of action 802 in user interface 800 is an example of how a course of action for responding to incidents of incident type 801 may be created and modified by administrator 342 using a visual programming language via administrative user system 302.

Course of action 802 is represented as a block flow diagram in a window for defining course of action 802. Course of action 802 may be defined in response to a particular incident or may be defined at some other time. Course of action 802 includes start point 821, end point 827, and decision point 824, and four action blocks, which include geolocate IP action 822, file reputation action 823, block IP action 825, and create ticket action 826 (obscured by popup interface element 803) visually represented by blocks therein. As noted above, the block diagram representing course of action 802 may comprise a visual programming language for courses of action, which allows for graphical manipulation (e.g., by manipulating the blocks in this example) of the course of action. The visual programming language is essentially a high-level representation of underlying instructions for incident handling system 301 to perform the defined actions. Of course, the actions described in course of action 802 may be different for other incidents or incident types. When course of action 802 is executed, incident response system 301 each action block as an action instruction in accordance with operations 500, 600, and 700, as described above. As such, if administrator 342 executes course of action 802, it is possible that administrator 342 may not be authorized to direct the performance of all action steps therein. Course of action 802's execution may therefore not complete. In some examples, incident response system 301 may authorize certain users to execute a course of action as a whole so that individual actions therein do not need to be authorized.

In addition to a visual representation of course of action 802, operation 600 further includes user interface elements execute button 811, new action button 812, and new decision point button 813. When selected by administrator 342, execute button 811 causes incident response system 301 to perform the actions specified in accordance with course of action 802. In some examples, incident response system 301 may be configured to automatically execute course of action 802 in response to detecting an incident of incident type 801. When selected by administrator 342, new action button 812 adds a new action step to course of action 403. When selected by administrator 342, new decision point button 813 adds a new decision point to course of action 403. Cursor 814 may be used to move blocks around on operation 600, indicate to which blocks connectors should attach, select "X" elements on blocks to delete the blocks, or perform some other type of user interface manipulation. It should be understood that other forms of interacting with operation 600 may also or instead be used, such as via touch input to a touchscreen.

User interface 800 further displays popup interface element 803. Popup interface element 803 is an example for how operating parameters and authorization information may be provided to incident response system 301. Popup interface element 803 may be displayed in response to administrator 342 using cursor 814 to click on block IP action 825. In this example, block IP action 825 uses both component 371 and component 372, though not necessarily in the same manner described in user operation 700. As such, popup interface element 803 provides selectable buttons that, when selected, allow administrator 342 to edit operating parameters 481, operating parameters 482, authentication information 471, and authentication information 472. If, for example, administrator 342 needs to enter authentication information 471 for incident response system 301 to receive in accordance with operation 200 described above, then administrator 342 selects the button in popup interface element 803 corresponding to authentication information 471. Another popup interface element may then be displayed, or popup interface element 803 may change its own display to provide an interface for entry of authentication information 471. Of course, user interface 800 is merely one example and other manners of providing information to incident response system 301 may also or instead be used.

Figure 9:
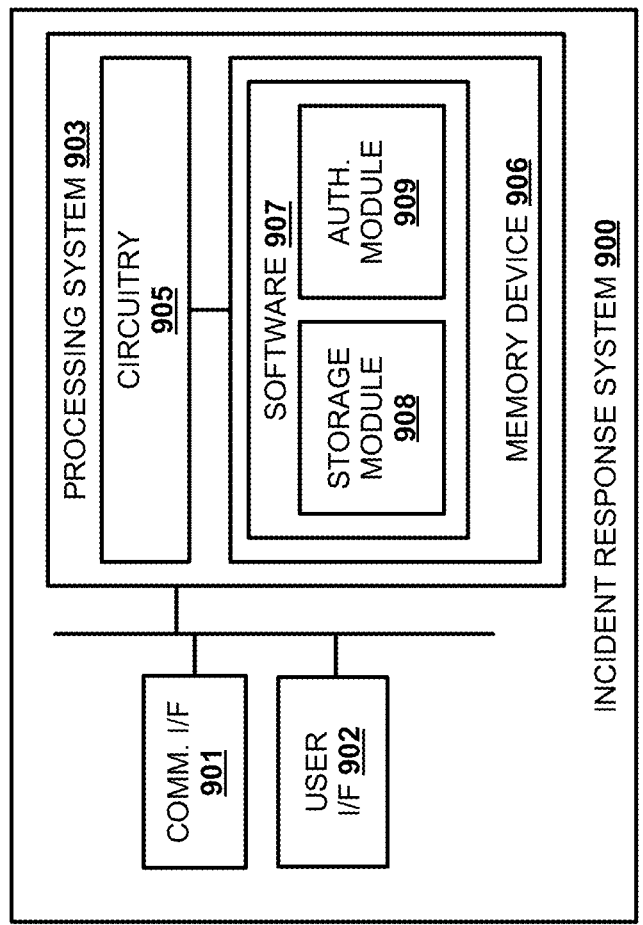
FIG. 9 illustrates an example computing architecture for storing and providing authentication information when responding to an IT incident.

FIG. 9 illustrates incident response system 900 for storing and providing authentication information when responding to an IT incident. Incident response system 900 is an example computing architecture for incident response system 101 and incident response system 301, although alternative configurations may also be used. Incident response system 900 may similarly be an example architecture for other elements described above, such as user system 102 and administrative user system 302, although alternative configurations may also be used. Incident response system 900 comprises communication interface 901, user interface 902, and processing system 903. Processing system 903 is linked to communication interface 901 and user interface 902. Processing system 903 includes processing circuitry 905 and memory device 906 that stores operating software 907.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof.

User interface 902 comprises components that interact with a user. User interface 902 may include a keyboard, display screen, mouse, touch pad, or some other user input/output apparatus. User interface 902 may be omitted in some examples.

Processing circuitry 905 comprises processing circuitry, such as a microprocessor, and other circuitry that retrieves and executes operating software 907 from memory device 906. Memory device 906 comprises one or more computer readable storage media, such as a disk drive, flash drive, data storage circuitry, or some other memory apparatus that in no cases should be considered a mere propagated signal. Operating software 907 comprises computer programs, firmware, or some other form of machine-readable processing instructions. Operating software 907 includes storage module 908 and authorization module 909. Operating software 907 may further include an operating system, utilities, drivers, network interfaces, applications, or some other type of software. When executed by circuitry 905, operating software 907 directs processing system 903 to operate incident response system 900 as described herein.

In particular, authentication module 909 directs processing system 903 to receive authentication information for use by a first component for responding to an incident in an information technology (IT) environment. Storage module 908 directs processing system 903 to encrypt the authentication information and store the authentication information in the incident response system along with encrypted parameters for operating the first component. Upon determining that the first component requires the authentication information for an interaction, storage module 908 directs processing system 903 to retrieve the authentication information and provide the authentication information to the first component.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method performed by an incident response system for improving information technology (IT) incident response, the method comprising:
   receiving authentication information and operating parameters associated with a first component of an IT environment;
   storing an encrypted copy of the authentication information and an encrypted copy of the operating parameters in a data store;
   identifying an incident in the IT environment;
   identifying a course of action to be used to respond to the incident, wherein the course of action includes a plurality of actions, and wherein the plurality of actions includes an action involving the first component of the IT environment;
   automatically initiating execution of the course of action;
   decrypting the encrypted copy of the authentication information and the encrypted copy of the operating parameters; and
   providing the authentication information and at least one of the operating parameters to a second component of the IT environment, wherein the second component uses the authentication information to interact with the first component.

2. The method of claim 1, further comprising:
   in the incident response system, receiving an instruction from a user that initiates the action; and
   determining that the user is authorized to instruct performance of the action.

3. The method of claim 1, further comprising:
   automatically initiating the action; and
   determining that the incident response system is authorized to automatically instruct performance of the action.

4. The method of claim 1, further comprising:
   determining that the first component should be accessed in response to the incident.

5. The method of claim 1, further comprising:
   configuring the first component in accordance with the operating parameters.

6. The method of claim 1, wherein the first component comprises a virtualized computing element and the method further comprises:
   instantiating the first component on a host in accordance with the operating parameters.

7. The method of claim 1, further comprising:
   in the incident response system, subsequent to the first component accepting the authentication information, interacting with the first component.

8. The method of claim 1, wherein the operating parameters include instructions for interacting with the first component.

9. The method of claim 1, wherein the authentication information comprises one or more of access credentials for a user to access the first component and access credentials for the first component to access a second component.

10. The method of claim 1, wherein receiving the authentication information comprises:
    causing display of a course of action for responding to the incident in a visual programming language; and
    causing display of an authentication information entry element in association with the action that, at least in part, uses the first component when performed.

11. One or more non-transitory computer readable storage media having program instructions stored thereon for improving information technology incident response, the program instructions, when read and executed by a processing system of an incident response system, direct the processing system to:
- receive authentication information and operating parameters associated with a first component of an information technology (IT) environment;
- store an encrypted copy of the authentication information and an encrypted copy of the operating parameters in a data store;
- identify an incident in the IT environment;
- identify a course of action to be used to respond to the incident, wherein the course of action includes a plurality of actions, and wherein the plurality of actions includes an action involving the first component of the IT environment;
- automatically initiate execution of the course of action;
- decrypt the encrypted copy of the authentication information and the encrypted copy of the operating parameters; and
- provide the authentication information and at least one of the operating parameters to a second component of the IT environment, wherein the second component uses the authentication information to interact with the first component.

12. The one or more computer readable storage media of claim 11, wherein the program instructions further direct the processing system to:
- receive an instruction from a user that initiates the action; and
- determine that the user is authorized to instruct performance of the action.

13. The one or more computer readable storage media of claim 11, wherein the program instructions further direct the processing system to:
- automatically initiate the action; and
- determine that the incident response system is authorized to automatically instruct performance of the action.

14. The one or more computer readable storage media of claim 11, wherein the program instructions further direct the processing system to:
- determine that the first component should be accessed in response to the incident.

15. The one or more computer readable storage media of claim 11, wherein the program instructions further direct the processing system to:
- configure the first component in accordance with the operating parameters.

16. The one or more computer readable storage media of claim 11, wherein the first component comprises a virtualized computing element and wherein the program instructions further direct the processing system to:
- instantiate the first component on a host in accordance with the operating parameters.

17. The one or more computer readable storage media of claim 11, wherein the program instructions further direct the processing system to:
- subsequent to the first component accepting the authentication information, interact with the first component.

18. The one or more computer readable storage media of claim 11, wherein the operating parameters include instructions for interacting with the first component.

19. The one or more computer readable storage media of claim 11, wherein the authentication information comprises one or more of access credentials for a user to access the first component and access credentials for the first component to access a second component.

20. The one or more computer readable storage media of claim 11, wherein to receive the authentication information, the program instructions direct the processing system to:
- cause display of a course of action for responding to the incident in a visual programming language; and
- cause display of an authentication information entry element in association with the action that, at least in part, uses the first component when performed.

21. An apparatus of an incident response system for improving information technology incident response, the apparatus comprising:
- one or more non-transitory computer readable storage media;
- a processing system operatively coupled with the one or more computer readable storage media; and
- program instructions stored on the one or more computer readable storage media that, when read and executed by the processing system, direct the processing system to:
  - receive authentication information and operating parameters associated with a first component of an information technology (IT) environment;
  - store an encrypted copy of the authentication information and an encrypted copy of the operating parameters in a data store;
  - identify an incident in the IT environment;
  - identify a course of action to be used to respond to the incident, wherein the course of action includes a plurality of actions, and wherein the plurality of actions includes an action involving the first component of the IT environment;
  - automatically initiate execution of the course of action;
  - decrypt the encrypted copy of the authentication information and the encrypted copy of the operating parameters; and
  - provide the authentication information and at least one of the operating parameters to a second component of the IT environment, wherein the second component uses the authentication information to interact with the first component.

22. The apparatus of claim 21, wherein the program instructions further direct the processing system to:
- receive an instruction from a user that initiates the action; and
- determine that the user is authorized to instruct performance of the action.

23. The apparatus of claim 21, wherein the program instructions further direct the processing system to:
- automatically initiate the action; and
- determine that the incident response system is authorized to automatically instruct performance of the action.

24. The apparatus of claim 21, wherein the program instructions further direct the processing system to:
- determine that the first component should be accessed in response to the incident.

25. The apparatus of claim 21, wherein to receive the authentication information, the program instructions direct the processing system to:
- cause display of a course of action for responding to the incident in a visual programming language; and
- cause display of an authentication information entry element in association with the action that, at least in part, uses the first component when performed.

* * * * *